United States Patent Office 3,816,534
Patented June 11, 1974

3,816,534
14 - OXOBICYCLO[10.4.0]HEXADEC - 1(12) - ENE,
14 - OXOBICYCLO[10.4.0]HEXADEC - 12 - ENE,
14 - OXOBICYCLO[10.4.0] - HEXADECANE AND PROCESSES FOR THEIR PREPARATION
Seymour Lemberg, Elizabeth, and Audley L. Cain, Hackensack, N.J., assignors to Stepan Chemical Company, Maywood, N.J.
No Drawing. Filed Nov. 16, 1970, Ser. No. 90,113
Int. Cl. C07c 49/44
U.S. Cl. 260—586 R                      8 Claims

ABSTRACT OF THE DISCLOSURE

14 - Oxobicyclo[10.4.0]hexadec-1(12)-ene (I), which has an extremely strong, sweet musk odor and is useful in the perfume art as an odorant, is prepared by reaction of cyclododecane with morpholine to produce 1-morpholinocyclododecene, reaction of this product with methyl vinyl ketone followed by acid hydrolysis to form 2-(3-oxobutyl)cyclododecanone, and base-catalyzed cyclization of this diketone to a mixture of (I) and its isomer 14-oxobicyclo[10.4.0]hexadec-12-ene (II) containing less than about 10% of (I). A product enriched in (I) is obtained by distillation of this mixture in the presence of base, or by ketallization of (I) and (II) followed by hydrolysis. Hydrogenation of (I) or (II) or hydrogenation of their ketals followed by hydrolysis yields 14-oxobicyclo[10.4.0]hexadecane, which has a musky odor and, like (I), is useful as an odorant.

This invention relates to 14-oxobicyclo[10.4.0]hexadecenes and decanes, and more particularly the 1(12)- and 12-hexadecene isomers and the corresponding saturated hexadecane, and to methods for their preparation.

The subject compounds may be represented by the formula

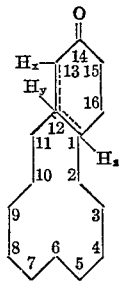

wherein $x$ has a value of 1 or 2, each of $y$ and $z$ has a value of 0 or 1, the sum of $x+y+z$ is 2 or 4, $x$ is not equal to $y$, and the dotted lines represent potential olefinic double bonds depending upon the values of $x$, $y$ and $z$. When $x$ is 2 and $y$ and $z$ are 0, the compound is 14-oxobicyclo[10.4.0]hexadec - 1(12)-ene (I), which, because the double bond is between the beta- and gamma-carbons of the cyclohexenone ring with respect to the carbonyl group, is hereinafter referred to as the beta,gamma-isomer. When $x$ is 1, $y$ is 0 and $z$ is 1, the compound is 14-oxobicyclo[10.4.0]hexadec-12-ene (II), or the alpha,beta-isomer. The beta,gamma-isomer has an extremely strong, sweet musk odor, making it useful as an odorant and, although the alpha,beta-isomer is odorless, it is useful as an intermediate for the preparation of the beta,gamma-isomer. When $x$ is 2 and both $y$ and $z$ are 1, the compound is 14-oxobicyclo[10.4.0]hexadecane (III), which like (I), has a musky odor and is useful as an odorant. Thus this invention is concerned with an odorant selected from the group consisting of 14-oxobicyclo[10.4.0]-hexadec-1(12)-ene and 14-oxobicyclo[10.4.0]-hexadecane.

The unsaturated compounds of this invention are readily prepared from known compounds by a multi-step sequence comprising:

(A) Condensation of cyclododecanone with morpholine to produce morpholino-1-cyclododecene (IV);
(B) Reaction of (IV) with methyl vinyl ketone to produce an internal salt (V);
(C) Hydrolysis of salt (V) to form 2-(3-oxobutyl) cyclododecanone (VI); and
(D) Base catalyzed cyclization of (V) to form a mixture of (I) and (II).

This sequence is a specific application of the enamine alkylation as disclosed by Stork et al. at J. Am. Chem. Soc., 85, 207–221 (1963), and is illustrated as follows:

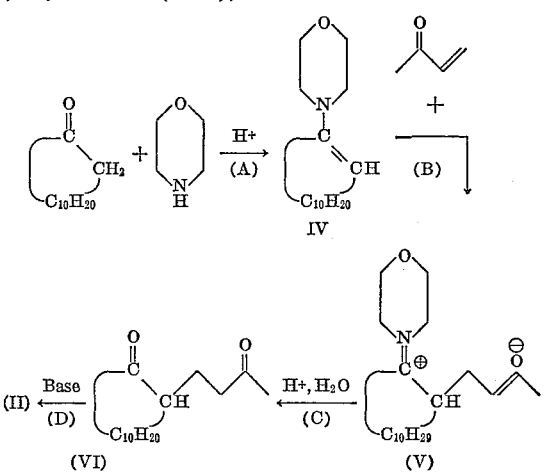

wherein $C_{10}H_{20}$ represents the balance of the bicyclohexadecene ring system.

In the first step (Step A) of this sequence, cyclododecanone is condensed with an amine, preferably morpholine, in the presence of an acid catalyst. The reaction is desirably effected under conditions such that the water of reaction is removed as it is formed, as for example by employing an organic solvent, such as toluene, which forms an azeotrope with water, and distilling off the water-solvent azeotrope. In such systems, organic acid catalysts, such as p-toluenesulfonic acid are employed. The ratio of reactants is not critical, but the morpholine or other amine is normally employed in molar excess to assure the greatest efficiency with respect to the more expensive cyclodecanone. Pure (IV) can be recovered, if desired, by distilling off solvent and unreacted morpholine.

In the second step (Step B) morpholinocyclododecene (IV) is reacted with methyl vinyl ketone under an inert (e.g., nitrogen or argon) atmosphere. This reaction, like that employed in Step A, is a well known synthetic procedure, and the reaction conditions of temperature, solvent, proportions, etc., are readily determinable by those of ordinary skill in the art. Is is preferred for economic reasons to employ the methyl vinyl ketone in excess. The reaction is desirably effected in an inert solvent, e.g., dioxan, furan, ether and the like, at a temperature of about room temperature or slightly above (e.g., 25–30° C.). The salt (V) is insoluble in non-polar organic solvents, and may be recovered from the reaction mixture by filtration.

Salt (V) is hydrolyzed to diketone (VI) in step C employing conventional, acid-catalyzed hydrolysis techniques. For example the salt may be admixed with dilute aqueous hydrochloric acid and the resulting diketone (VI) is recovered by filtration.

The last step (Step D) of the above-mentioned sequence comprises a base-catalyzed cyclization of diketone (VI) to yield a mixture of (I) and (II). Once again the general procedure employed are known, and the conditions employed are generally apparent to the art. The base employed is a strong inorganic base, such as an alkali metal hydroxide (e.g., potassium hydroxide) or an alkali metal amide (e.g., sodium amide), although strong organic bases, such as sodium methoxide, may also be employed. The cyclization is desirably effected in the presence of an organic solvent, such as an alcohol, for example methanol or ethanol, or an aromatic hydrocarbon, e.g., benzene or toluene, and at moderately elevated temperatures, for example 30° C. to 50° C. After separation of the aqueous and organic layers, the organic layer may be concentrated to yield a mixture of (I) and (II) having a weak musky odor.

This product is essentially crude alpha,beta-isomer, with the beta-gamma-isomer comprising not more than 10 percent of the mixture. The two isomers can be recovered by a variety of techniques. For example, the alpha,beta-isomer can be recovered by recrystallization of the crude mixture from a hydrocarbon solvent such as hexane. The beta,gamma-isomer is more readily recovered by careful distillation or gas chromatographic techniques.

It is not necessary that the beta,gamma-isomer be isolated in pure form for use as an odorant. Indeed, the crude product obtained from Step D can be used if desired. However, mixtures containing at least about 30 percent beta,gamma-isomer are preferred because of the increased amplitude of intensity of the desired musk odor. Further enrichment in the content of (I) can be effected if desired, but ordinarily it is unnecessary to provide mixtures containing greater than about 40 percent (I).

Mixtures having the desired 30 to 40 percent beta, gamma-isomer content may be obtained by vacuum distillation of the alpha,beta-isomer or a mixture thereof with the beta,gamma-isomer in the presence of base, whereby the alpha,beta-isomer isomerizes to the beta,gamma-isomer form. This reaction is entirely unexpected because pure alpha,beta-isomer distills without isomerization and bases tend to promote isomerization of the beta,gamma-isomer to the alpha,beta-isomer at moderate temperatures. Moreover, very little isomerization occurs even at the tempeartures at which distillation is effected, but under pressures sufficient to prevent vaporization of the oxobicyclohexadecene(s).

Distillation is generally effected at about 140° C. to about 180° C., with a temperature of about 150° C. being preferred. At temperatures below about 140° C., little enrichment in the desired beta,gamma-isomer occurs, whereas temperatures in excess of about 180° C. lead to thermal decomposition of the compounds.

The base which is employed as the isomerization catalyst is a strong base, such as alkali metal hydroxides, lower alkoxides or amides. Suitable bases include sodium or potassium hydroxide, sodium methoxide, potassium t-butoxide, sodium amide and the like. Only a small amount of base, e.g., 1 weight percent or less, based upon the alpha,beta-isomer, is necessary to promote the isomerization, and even the trace amounts remaining in the crude product obtained from the cyclization reaction have been found sufficient.

Although mixtures containing in excess of 40 percent of (I) are not necessary for commercial use, they can be obtained if desired by ketallization of the mixed isomers followed by hydrolysis of the ketal to the bicyclic ketone. The ketallization leads only to the ketal of beta,gamma-isomer (I), which may be illustrated by the formula:

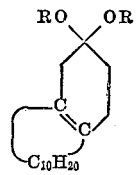

(VII)

wherein each R is lower alkyl or the two R's, when taken together, are lower alpha,beta-alkylene, especially ethylene or propylene. The ketallization is effected through the use of techniques known to steroid chemists for ketallization of 3-keto-$\Delta^4$-steroids. Thus, the mixture of (I) and (II) is reacted with an alcohol, e.g., methanol or an alpha, beta-glycol, preferably ethylene glycol or propylene glycol, in the presence of an acid catalyst, typically p-toluenesulfonic acid, and an azeotroping agent such as toluene, while removing the water of reaction by distilling.

Ketal (VII) is then hydrolyzed to yield a mixture of (I) and (II) which is enriched in (I), with the ratio of (I) to (II) being dependent upon the amount of water present during hydrolysis. Thus, with small quantities of water, i.e. 5 percent or less based upon ketal (VII), the mixture will contain about 30 percent (I) or less, while large quantities of water (1.5 or 2 times the weight of ketal (VII)) yield a mixture containing up to 70 or 75 percent (I) or more. In general, the weight ratio of water to keta should be at least about to yield a mixture in which the beta,gamma-isomer is greater than about 40 percent.

Except for the amount of water, the conditions for the hydrolysis of ketal (VII) are not critical to this invention and are known to those of ordinary skill in the art. It is preferred, however, to employ an organic acid, especially an aromatic sulfonic acid such as p-toluenesulfonic acid, as the catalyst and effect hydrolysis in an aqueous organic solvent system, such as a solution of water and acetone or other inert, water-miscible solvent. The acid normally is present in small amounts, e.g., less than about 5 weight percent, based upon the ketal. Hydrolysis is desirably conducted at elevated, e.g., reflux, temperature. The (I)-enriched mixture of (I) and (II) is recovered from this reaction mixture by conventional techniques. For example, after neutralization of the acid catalyst, the mixture is extracted with an organic solvent, preferably an aromatic hydrocarbon such as benzene or toluene, and the organic extract is distilled to yield the desired mixture. Purified beta,gamma-isomer may be obtained if desired through careful distillation or gas chromatographic separation of the enriched mixture.

Hydrogenation of (I) and/or (II) or hydrogenation of their corresponding ketals followed by hydrolysis yields 14 - oxobicyclo[10.4.0]hexadecane (III) which, like (I) has a musky odor and is therefore useful as an odorant. This saturated product is preferred to (I) for use as an odorant in an alkaline environment because of its superior stability under alkaline conditions. As noted above, base causes (I) to isomerize to odorless (II), and thus (I) is not suitable for use in alkaline media where long shelf-life is desired.

Hydrogenation is carried out by any suitable technique, desirably by contacting the unsaturated starting material with hydrogen at elevated pressures, desirably 100 or 1000 p.s.i., and moderate temperatures, desirably room temperature (20–25° C.) to about 50° C., in the presence of a catalyst. It has been found that the alpha,beta-unsaturated ketone can be hydrogenated in the presence of palladium on carbon as a catalyst. However, this catalyst did not promote hydrogenation of the ketal of the beta, gamma-isomer. Rather, upon completion of the procedure and hydrolysis there was obtained a mixture of (I) and (II) containing about 70% (I) which, unlike the normally solid mixtures of (I) and (II) obtained by the above-described procedures, is normally liquid (i.e. liquid at room temperature). It is believed that this phenomenon is due to different allotropic forms of the unsaturated ketones. Saturated ketone (III) can be obtained from the beta,gamma-ketal, however, through the use of rhodium on carbon as a catalyst.

The conditions of hydrolysis of the hydrogenated ketals to the free saturated ketone (III) are not critical, and conditions as discussed above may be used.

The following examples are illustrative.

EXAMPLE 1

A solution of 455 g. (2.5 mol) cyclododecanone and 348 g. (4 mol) of morpholine and 3.5 g. p-toluenesulfonic acid in 1470 g. toluene was refluxed 72 hrs. under a Dean-Stark water separator. After solvent removal, the residual oil was fractionated to remove unreacted cyclododecanone and 296 g. of morpholino-1-cyclododecene (IV) was collected at 124–133° C./0.5 Torr.

To a solution of 259 g. (1.03 mol) morpholino-1-cyclododecene in dioxane (206 g.) under nitrogen was added over 1 hr. 94 g. (1.34 mol) of freshly distilled methyl vinyl ketone. The reaction was mildly exothermic and the temperature was not allowed to exceed 27° C. The mixture was agitated 18 hrs., during which time a mass of white solid precipitated. Hexane (33 g.) was added and the salt (V) was collected on a filter and washed with 132 g. of hexane. The salt was then hydrolyzed by overnight agitation in a solution of 3000 g. water and 100 ml. concentrated hydrochloric acid. The resulting mixture was filtered and the filtrate was washed acid free and dried to yield 198 g. of 2-(2-oxobutyl)cyclododecanone (VI), M.P. 61–62° C.; IR ($CCl_4$) 5.81, 5.86μ (C=O); NMR δ 2.01 ($CH_3CO$).

To a solution of 210 g. (0.83 mol) diketone (VI) in 950 g. benzene at 24° C. under nitrogen was charged 36 g. (0.92 mol) sodium amide. The reaction was exothermic and the temperature was not allowed to exceed 40° C. Within about 90 min. the temperature had subsided to 25° C. After agitating 20 hrs. the reaction was quenched with water (1000 g.), the lower aqueous layer withdrawn, and the organic layer agitated ½ hr. with 1000 g. water, 10 ml. concentrated hydrochloric acid and 1 g. Norite. After filtration, the organic layer was concentrated in vacuo to yield an oil weighing 197 grams, having a faintly musky odor and containing less than 10 percent 14-oxobicyclo[10.4.0]hexadec-1(12)-ene (I). The oil solidified on cooling, and recrystallization from hexane gave pure 14-oxobicyclo[10.4.0]hexadec-12-ene (II) M.P. 78–79° C.; IR ($CCl_4$) 5.97μ (C=O); NMR δ 5.71 (HC=C).

This isomer distills unchanged, B.P. 153–160° C./0.3 Torr; M.P. 78.5–79° C.

EXAMPLE 2

Fifty grams of pure alpha,beta-isomer (II) produced as described in Example 1 was distilled in the presence of 0.3 g. potassium hydroxide to give 38.2 g. of a mixture of isomers (I) and (II), B.P. 153–154° C./0.3 Torr; IR ($CCl_4$) 5.79, 5.97μ (C=O). This product had a strong musk-like odor and contained about 31% beta,gamma-isomer (I) as determined by chromatographic analysis.

EXAMPLE 3

The mixture of (I) and (II) containing less than about 10% of (I) produced from 75 g. of diketone (VI) in the manner described in Example 1 was agitated 1 hr. in a solution of 16.8 g. potassium hydroxide in 308 g. methanol. After drowning in water, the solid was collected on a filter, washed and distilled to give 44.6 g. of a mixture of (I) and (II), B.P. 135–145° C./<1 Torr. This material contained 39% beta,gamma-isomer and had a strong sweet musk odor.

EXAMPLE 4

To a 30° solution of 46 g. (0.82 mol) potassium hydroxide in 340 g. methanol was added over 55 min. a solution of 147 g. (0.63 mol) diketone (VI) in 450 g. methanol. The solution was agitated 22 hrs. at 45–50° C., drowned in 2000 g. water and agitated until a solid deposited. The solid was collected on a filter, then distilled to yield 112 g. of a musk product containing 33% beta, gamma-isomer (I), 57% alpha,beta-isomer (II) and 10% of an unknown lower retention time compound. The musk odor of samples containing this lower retention time compound were noticeably woody.

EXAMPLE 5

A solution of 277 g. (1.18 mol) of a mixture of (I) and (II) containing less than 10% (I) prepared as described in Example 1, 370 g. (5.94 mol) ethylene glycol and 3 g. p-toluenesulfonic acid in 1040 g. toluene was refluxed 26 hrs. under a Dean-Stark water trap. After cooling the lower ethylene glycol layer was withdrawn and the toluene layer washed with water (1500 g.), aqueous soda ash (500 ml., of 2% solution) and finally water (1000 g.). Distillation gave 259 g. of the ethylene ketal of 14-oxobicyclo[10.4.0]dodec-1(12)-ene, B.P. 148–54° C./0.4 Torr; NMR ($CCl_4$) δ 3.82 (—$OCH_2CH_2O$—).

A solution of 174 g. (0.63 mol) of the ethylene ketal in acetone (625 g.) was added to a 33° C. solution of water (245 g.), acetone (310 g.) and p-toluenesulfonic acid (3.5 g.). The mixture was refluxed 3.25 hrs., then agitated 15 minutes at 40–45° C. with aqueous soda ash (50 ml. of 10% solution) and finally drowned in 2000 g. of water. The aqueous layer was withdrawn, concentrated, extracted with 88 g. of benzene and the organic layers combined and clarified with 0.5 g. Norite. Distillation (0.1 g. soda ash added) yielded 123 g. B.P. 144–150° C./ 0.4 Torr of a product: IR ($CCl_4$) 5.79, 5.96μ (C=O) having a very strong, sweet musk odor and containing about 75% of 14-oxobicyclo[10.4.0]dodec-1(12)-ene.

Using preparative gas chromatography (an F&M 5750 Research Gas Chromatograph with an 8 foot by ¼ wide column packed with 25% SE-30 on Chromosorb W) an enriched sample of (I) having a purity of about 90% is obtained. NMR ($CCl_4$) δ 2.67 (=C—$CH_2CO$), δ 2.28 (C=C—$CH_2$—).

EXAMPLE 6

A solution of 94 g. (0.78 mol) of (II) in 480 g. ethanol and containing 5 g. 5% Pd/C was agitated under hydrogen for 5 hrs. at 25–30° C. and 400 p.s.i. There was obtained 81 grams of 14-oxobicyclo[10.4.0]hexadecane (III). B.P. 136–146° C./0.1 Torr, IR ($CCl_4$) 5.82μ. This product had a weak musky odor.

EXAMPLE 7

A solution of 20 g. of ketal (VII) in 92 g. ethanol and containing 2 g. 5% Rh/C was agitated under hydrogen for 24 hrs. at 30–35° C. and 500 p.s.i. After catalyst removal, the filtrate, together with an additional 40 g. ethanol, 30 g. water and 3 ml. concentrated hydrochloric acid, was heated at gentle reflux for 1 hr. The cooled solution was then poured into aqueous soda ash and extracted with carbon tetrachloride. Distillation yielded 11.6 g. of 14-oxobicyclo[10.4.0]hexadecane (III). B.P. 122–130° C./0.08 Torr; IR ($CCl_4$) 5.82μ.

EXAMPLE 8

A hydrogenation unit was charged with 30 g. ketal (VII), 80 g. ethanol and 1.5 g. 5% Pd/C. This mixture was agitated under hydrogen at 25–30° C. and 500 p.s.i. for about 24 hrs. The catalyst was removed by filtration, and the filtrate, together with 40 g. ethanol, 30 g. water and 0.5 g. p-toluene sulfonic acid, was heated on the steam bath for 3.25 hrs. The cooled mixture was treated with aqueous soda ash, concentrated and extracted with carbon tetrachloride. Distillation yielded 18.7 g. of a product boiling at 152–157° C./0.5 Torr containing about 70% beta,gamma-isomer (I) and 30% alpha,beta-isomer (II), the product had a sweet musk odor. The infrared and nuclear magnetic resonance (NMR) spectra were identical to those of the product of Example 5. However, the product of this Example was liquid at room temperature, whereas that of Example 5 was solid.

What is claimed is:

1. A compound selected from the group consisting of 14-oxobicyclo[10.4.0]hexadec-1(12)-ene and 14-oxobicyclo[10.4.0]hexadecane.

2. 14-oxobicyclo[10.4.0]hexadec-1(12)-ene according to claim 1.

3. 14-oxobicyclo[10.4.0]hexadecane according to claim 1.

4. 14-oxobicyclo[10.4.0]hexadec-12-ene.

5. A mixture of 14-oxobicyclo[10.4.0]hexadec-1(12)-ene and 14-oxobicyclo[10.4.0]hexadec-12-ene containing from about 30 to about 75 percent 14-oxobicyclo[10.4.0]hexadec-1(12)-ene.

6. A normally solid mixture according to claim 5.

7. A normally liquid mixture according to claim 5.

8. A mixture according to claim 5 containing from about 30 to about 40 percent 14-oxobicyclo[10.4.0]hexadec-1(12)-ene.

No references cited.

DONALD G. DAUS, Primary Examiner

J. H. TURNIPSEED, Assistant Examiner

U.S. Cl. X.R.

252—522; 260—340.9